C. M. MURCH.
Running Gear for Vehicles.
No. 168,768.　　　　　　　　　　　　Patented Oct. 11, 1875.
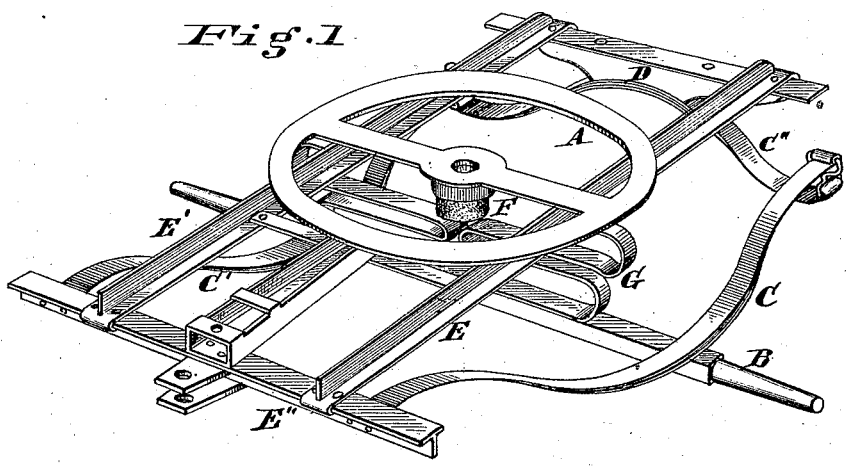
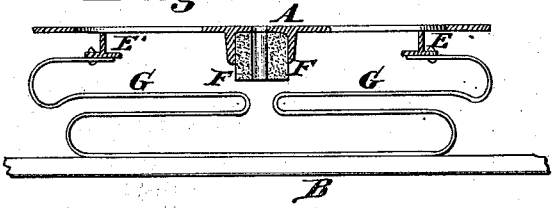

UNITED STATES PATENT OFFICE.

CHAUNCEY M. MURCH, OF CINCINNATI, OHIO.

IMPROVEMENT IN RUNNING-GEARS FOR VEHICLES.

Specification forming part of Letters Patent No. 168,768, dated October 11, 1875; application filed August 13, 1875.

*To all whom it may concern:*

Be it known that I, CHAUNCEY M. MURCH, of Cincinnati, Hamilton county, State of Ohio, have invented an Improvement in Running-Gear for Vehicles, of which the following is a specification:

My invention consists, in the first place, of a carriage-spring, which will give readily under a light load, and at the same time prove strong enough for a very great increase of load, if necessary; and consists for this purpose, in connection with any ordinary carriage-spring—much reduced in strength, however—of a peculiarly-shaped auxiliary spring, hereafter described, together with a rubber or other flexible bumper, the whole combined and constructed to give great flexibility, and counteract the effect of an increase of load; and my invention is designed, in the second part, to cheapen the cost of construction of the frame between the fifth-wheel of the vehicle and the springs, and consists of three pieces of T angle-iron, peculiarily arranged and connected as hereafter described.

A is the fifth-wheel of a carriage; B, the front axle; and C C' C'' the different members of a "platform-spring" resting upon said axle. The cross-spring C'' is secured to the bar D by its middle, while its ends connect to the ends of the side springs C C'. The other ends of the side springs connect to a cross-bar, E'', which is one member of my improved frame E E' E'', consisting of T angle-iron, as seen in the drawing. Resting on top of bars E E' is the fifth-wheel A, the bars E E' resting themselves upon bar E'' in front, and upon bar D behind. The desirable point gained by this adaptation of T angle-iron is cheapness in the first cost of construction, and also in its adaptability for connection with the other parts. The side bars E E', as shown, are arranged so that the flat web rests upon the bars D E'', and this gives flanges for the insertion of rivets or bolts to connect these bars, as shown, together. The arrangement of the bar E'' provides facilities for the attachment by simple means, as shown, of the side springs C C'. Not only this, but the arrangement of the bars D E'' E' E in relation to each other enables the manufacturer to bend down the ends of the bars E E' to overlap, in the manner shown, the cross-bars D E'', and thus afford strong means of connection. To the fifth-wheel A a bumper, F, is secured, and between the axle B and the side bars E E' my peculiar spring G is introduced. It is bent as shown, and acts to cause the relief of the load upon the platform-spring, so that very light flexible springs C C' C'' may be used, and ease thus given to a light load of passengers, and at the same time, owing to the fact that the spring G stiffens rapidly, and finally checks up against the bumper F, a heavy load can be successfully counteracted. Furthermore, the presence of the spring G prevents the rattling shackling action peculiar to platform-springs without such provision.

I claim—

1. In the running-gear of vehicle the frame, composed of the T angle-bars E E' E'' D, and interposed between the springs and the fifth-wheel, substantially as and for the purpose specified.

2. In combination with the ordinary springs of a vehicle the spring G and bumper F, connected and operating substantially in the manner and for the purpose specified.

In testimony of which invention I hereunto set my hand.

CHAUNCEY M. MURCH.

Witnesses:
   JOHN E. JONES,
   E. T. HAINES.